United States Patent
Kobayashi et al.

(10) Patent No.: US 10,636,581 B2
(45) Date of Patent: Apr. 28, 2020

(54) ELECTRIC DOUBLE LAYER CAPACITOR

(71) Applicants: TPR CO., LTD., Chiyoda-ku, Tokyo (JP); TOC CAPACITOR CO., LTD., Nagano (JP); Masaki Yoshio, Saga-shi, Saga (JP)

(72) Inventors: Naoya Kobayashi, Nagano (JP); Masaki Yoshio, Saga (JP)

(73) Assignees: TPR CO., LTD., Tokyo (JP); TOC CAPACITOR CO., LTD., Nagano (JP); Masaki Yoshio, Saga-shi, Saga (JP)

( * ) Notice: Subject to any disclaimer, the term of this patent is extended or adjusted under 35 U.S.C. 154(b) by 0 days.

(21) Appl. No.: 15/760,969

(22) PCT Filed: Jun. 17, 2016

(86) PCT No.: PCT/JP2016/068124
§ 371 (c)(1),
(2) Date: Mar. 16, 2018

(87) PCT Pub. No.: WO2017/216960
PCT Pub. Date: Dec. 21, 2017

(65) Prior Publication Data
US 2019/0103233 A1  Apr. 4, 2019

(51) Int. Cl.
*H01G 11/06* (2013.01)
*H01G 11/28* (2013.01)
(Continued)

(52) U.S. Cl.
CPC ............. *H01G 11/06* (2013.01); *H01G 11/28* (2013.01); *H01G 11/32* (2013.01); *H01G 11/68* (2013.01);
(Continued)

(58) Field of Classification Search
CPC ........ H01G 11/06; H01G 11/28; H01G 11/32; H01G 11/50
(Continued)

(56) References Cited

U.S. PATENT DOCUMENTS 6,191,935 B1 * 2/2001 Okamura ............... H01G 9/155
29/25.03
2003/0129497 A1 7/2003 Yamamoto et al.
(Continued)

FOREIGN PATENT DOCUMENTS

CN 101286576 A 10/2008
CN 102171869 A 8/2011
(Continued)

OTHER PUBLICATIONS

International Search Report for PCT/JP2016/068124 dated Aug. 30, 2016.
(Continued)

*Primary Examiner* — Michael P McFadden
(74) *Attorney, Agent, or Firm* — Nixon Peabody LLP; Jeffrey L. Costellia

(57) ABSTRACT

This electric double layer capacitor is an electric double layer capacitor capable of maintaining a discharge capacity retention rate of 80% or more in a constant current and constant voltage continuous charge test at 60° C. and 3.5 V for 1,000 hours or more,
wherein a positive electrode includes graphite as a positive-electrode active material, a current collector on the positive electrode side is an aluminum material, the aluminum material is coated with an amorphous carbon film, and the amorphous carbon film has a thickness in the range from 60 nm or more to 300 nm or less.

11 Claims, 2 Drawing Sheets

(51) Int. Cl.
*H01G 11/32* (2013.01)
*H01G 11/70* (2013.01)
*H01G 11/68* (2013.01)
*H01G 11/50* (2013.01)

(52) U.S. Cl.
CPC ............ *H01G 11/70* (2013.01); *H01G 11/50* (2013.01); *Y02E 60/13* (2013.01)

(58) Field of Classification Search
USPC ......................................................... 361/502
See application file for complete search history.

(56) References Cited

U.S. PATENT DOCUMENTS

| | | | | |
|---|---|---|---|---|
| 2007/0247788 | A1* | 10/2007 | Sakata | H01G 11/38 361/523 |
| 2009/0135548 | A1* | 5/2009 | Yoshio | H01G 11/42 361/502 |
| 2009/0296315 | A1* | 12/2009 | Eguchi | H01G 11/38 361/502 |
| 2011/0123861 | A1 | 5/2011 | Wu et al. | |
| 2011/0292569 | A1 | 12/2011 | Gadkaree et al. | |
| 2013/0045427 | A1* | 2/2013 | Zhamu | H01M 4/38 429/403 |
| 2013/0288138 | A1 | 10/2013 | Tikhonov et al. | |
| 2015/0116905 | A1 | 4/2015 | Gadkaree et al. | |

FOREIGN PATENT DOCUMENTS

| | | |
|---|---|---|
| CN | 102593464 A | 7/2012 |
| CN | 102598366 A | 7/2012 |
| CN | 103094583 A | 5/2013 |
| CN | 103329331 A | 9/2013 |
| CN | 104064362 A | 9/2014 |
| JP | 2007-243153 | 9/2007 |
| JP | 2007-265852 | 10/2007 |
| JP | A-2008-536254 | 9/2008 |
| JP | 2008-251965 | 10/2008 |
| JP | 4194052 | 12/2008 |
| JP | 2010-040180 | 2/2010 |
| JP | 2010-135316 | 6/2010 |
| JP | 2011-046584 | 3/2011 |
| JP | 2012-049142 | 3/2012 |
| JP | A-2013-546137 | 12/2013 |
| JP | A-2014-041835 | 3/2014 |
| JP | 2014-080685 | 5/2014 |
| JP | 5578925 | 8/2014 |
| JP | A-2014-157801 | 8/2014 |
| JP | 2016-054277 | 4/2016 |
| WO | WO-2005/089390 A1 | 9/2005 |
| WO | WO-2009/069250 | 6/2009 |
| WO | WO-2010-106749 | 9/2010 |
| WO | WO-2012/064481 A2 | 5/2012 |
| WO | WO-2012/067952 | 5/2012 |
| WO | WO-2016/090963 A1 | 6/2016 |

OTHER PUBLICATIONS

Japanese Office Action for Application No. 2016-543085 dated Dec. 20, 2016.
Japanese Notice of Allowance for Application No. 2016-543085 dated Apr. 25, 2017.
Korean Notice of Allowance (Application No. 10-2018-7008845) dated Jul. 24, 2018.
Chinese Office Action (Application No. 201680054792.8) dated Aug. 17, 2018.
Notice of Allowance (Taiwanese Application No. 106119770) dated Feb. 7, 2018.
European Search Report (Application No. 16905514.2) dated Apr. 18, 2019.

* cited by examiner

ELECTRIC DOUBLE LAYER CAPACITOR

TECHNICAL FIELD

The present invention relates to an electric double layer capacitor.

BACKGROUND ART

Conventionally, as a technology for storing electric energy, electric double layer capacitors (for example, see Patent Document 1) and secondary batteries have been known. Electric double layer capacitors are much superior to secondary batteries in terms of lifetime, safety and power density. However, the electric double layer capacitors have a problem in that the energy density (volumetric energy density) is lower than that of the secondary batteries.

The energy (E) stored in the electric double layer capacitor is expressed as $E=\frac{1}{2} \times C \times V^2$ using the capacitance (C) and applied voltage (V) of the capacitor, and thus the energy is proportional to the capacitance and the square of the applied voltage. Therefore, in order to improve the energy density of the electric double layer capacitor, techniques for improving the capacitance and applied voltage of the electric double layer capacitor have been proposed.

As a technique for improving the capacitance of the electric double layer capacitor, a technique for increasing the specific surface area of the activated carbon constituting the electrode of the electric double layer capacitor has been known. At present, the known activated carbon has a specific surface area of 1,000 $m^2/g$ to 2,500 $m^2/g$. In an electric double layer capacitor using such activated carbon as an electrode, an organic electrolyte solution obtained by dissolving a quaternary ammonium salt in an organic solvent, an aqueous electrolyte solution such as sulfuric acid or the like is used as an electrolytic solution.

Since the organic electrolyte solution has a wide usable voltage range, the applied voltage can be increased and the energy density can be improved.

A lithium ion capacitor utilizing the principle of an electric double layer capacitor has been known as a technique for improving the applied voltage of the electric double layer capacitor. A capacitor that uses graphite or carbon capable of intercalating and deintercalating lithium ions as a negative electrode and uses activated carbon equivalent to an electrode material of an electric double layer capacitor capable of adsorbing and desorbing electrolyte ions as a positive electrode is called a lithium ion capacitor. Further, a capacitor that uses activated carbon equivalent to an electrode material of an electric double layer capacitor as one of the positive electrode and negative electrode and uses a metal oxide or a conductive polymer as the other electrode, that is, an electrode where a Faradaic reaction occurs, is called a hybrid capacitor. In the lithium ion capacitor, among the electrodes constituting the electric double layer capacitor, the negative electrode is constituted of graphite, hard carbon or the like serving as a negative electrode material in a lithium ion secondary battery, and it is an electrode in which lithium ions are inserted within the graphite or hard carbon. Lithium ion capacitors have a characteristic in that the applied voltage is larger than that of general electric double layer capacitors, that is, those in which both electrodes are constituted of activated carbon. However, when graphite is used for the electrode, there is a problem in that propylene carbonate cannot be used as an electrolytic solution. When graphite is used for the electrode, propylene carbonate is electrolyzed, and the electrolyzed product of propylene carbonate adheres to the surface of the graphite, thereby reducing the reversibility of lithium ions. Propylene carbonate is a solvent that can operate even at low temperatures. When propylene carbonate is applied to an electric double layer capacitor, the electric double layer capacitor can operate even at −40° C. Accordingly, in lithium ion capacitors, hard carbon in which propylene carbonate is difficult to be electrolyzed is used for electrodes. However, hard carbon has lower capacity per volume of electrode as compared with graphite, and the voltage is also lower than that of graphite (becomes a noble potential). Therefore, there is a problem in that the energy density of the lithium ion capacitor is lowered.

CITATION LIST

Patent Documents

[Patent Document 1] Japanese Unexamined Patent Application, First Publication No. 2011-046584
[Patent Document 2] Japanese Unexamined Patent Application, First Publication No. 2010-040180
[Patent Document 3] Japanese Patent No. 5578925
[Patent Document 4] Japanese Patent No. 4194052
[Patent Document 5] Japanese Unexamined Patent Application, First Publication No. 2014-080685

DISCLOSURE OF INVENTION

Technical Problem

However, it is difficult to further increase the energy density in conventional electric double layer capacitors using activated carbon as the active material of the positive electrode and the negative electrode. This is because although the conventional electric double layer capacitor using activated carbon has been used in the range of 2.5 to 2.7 V, when it exceeds 3.0 V, moisture internally present in the activated carbon and the functional group on the surface of the activated carbon decomposes to generate gas, which makes it difficult to increase the applied voltage.

In addition, as described above, when emphasis is placed on low temperature characteristics, it is similarly difficult to further increase the energy density of lithium ion capacitors in which it is difficult to use graphite having a high capacity as a negative electrode. Further, in lithium ion capacitors, since a copper foil is used as a current collector as with the case of the negative electrode of the lithium ion battery, when overdischarging to 2 V or less, there is a problem in that copper is eluted or the charge/discharge capacity is lowered. For this reason, there is a problem in that the method of use is limited as compared with the electric double layer capacitor capable of discharging to 0 V.

As an electric double layer capacitor of a new concept, a capacitor utilizing pseudocapacitance using graphite as a positive-electrode active material instead of activated carbon has been developed (see, for example, Patent Document 2). Since this capacitor is a capacitor using a pseudocapacitance for the positive electrode, it is not strictly an electric double layer capacitor. However, in the present invention, it will be referred to as an electric double layer capacitor in a broad sense. Patent Document 2 describes that in a conventional electric double layer capacitor using activated carbon as a positive-electrode active material, when a voltage exceeding 2.5 V is applied to the positive electrode, decomposition of an electrolytic solution occurs to generate gas, whereas in an electric double layer capacitor using graphite as a positive-electrode active material, decomposition of an electrolytic solution is not brought about even at a charging voltage of 3.5 V, and it can operate at a higher voltage than that of the conventional electric double layer capacitor using activated carbon as the positive-electrode active material. The ratio of specific surface area of graphite to the specific surface area of activated carbon is one to a few hundred, and this difference in electrolyte decomposing action is due to this large difference in specific surface area.

The electric double layer capacitor using graphite as a positive-electrode active material as described above is attractive in that it can realize a high energy density, and there is also a possibility that an even higher energy density can be realized.

However, in the electric double layer capacitor using graphite as the positive-electrode active material, the durability is not sufficient, and therefore the practical use thereof has been hindered.

The durability test is usually carried out by an acceleration test with increasing temperature (high temperature durability test, charge/discharge cycle test). The test can be carried out by a method in accordance with "Durability (continuous application of rated voltage at high temperatures) test" described in JIS D 1401: 2009. It is said that the deterioration rate becomes approximately doubled if the temperature is raised from room temperature by 10° C. As a high temperature durability test, for example, there is a test in which it is held (continuously charged) at a predetermined voltage (3 V or higher in the present invention) for 2,000 hours in a constant temperature chamber at 60° C., and then returned to room temperature to perform charge and discharge, thereby measuring the discharge capacity at that time. It is considered that after the high temperature durability test, it is desirable to satisfy a discharge capacity retention rate of 80% or more with respect to the initial discharge capacity.

For example, the following is a mechanism considered as a cause of aged deterioration leading to low durability of the electric double layer capacitor (see, for example, Patent Document 3). That is, in the electric double layer capacitor, residual moisture in the electrolyte solution and moisture entered at the time of assembly are present, and there is also physically adsorbed or chemically bonded moisture present on the surface of and inside the active material, the conductive material, the binder, the separator and the like. While repeating charge and discharge, the moisture desorbs as water, electrolyzes by application of a voltage and generates gas, and further decomposition of the electrolytic solution occurs, thereby generating decomposition products. These decomposition products cover the surface of the active material, thereby reducing the specific surface area of the activated carbon and causing reduction of the capacitance. In addition, these decomposition products also cause an increase in resistance by blocking the opening of the separator. Furthermore, residual functional groups on the surface of the activated carbon, such as OH groups, H groups, organic groups and the like, are decomposed at high voltage to increase the internal pressure due to the gas, and decomposition products cover the surface of the activated carbon, thereby causing adverse effects.

As described above, there are various factors that hamper the durability of the conventional electric double layer capacitor, and it is also considered that these factors are complicatedly intertwined. Thus, it was not possible to specify the main factor that hampers the durability. The actual situation is that, depending on the conditions to be used, the performance of the cell is maintained by prescribing the applied voltage and the operating ambient temperature, or releasing the gas when the internal pressure rises above a certain pressure by providing a gas valve.

Since deterioration tends to proceed as the voltage increases, it has been thought that it is difficult to identify a major factor that hampers durability and solve the problem so as to realize an electric double layer capacitor with a withstand voltage of 3 V or more.

The present invention has been made in view of the above circumstances, and has an object of providing an electric double layer capacitor capable of maintaining a discharge capacity retention rate of 80% or more in a constant current and constant voltage continuous charge test at 60° C. and 3.5 V for 1,000 hours or more.

Solution to Problem

As a result of intensive studies, the inventors of the present invention have found out that the main factor hampering the durability of the electric double layer capacitor using graphite as the positive electrode active material lies in the corrosion of the current collector, and conceived the present invention.

The present invention provides the following means.

(1) An electric double layer capacitor capable of maintaining a discharge capacity retention rate of 80% or more in a constant current and constant voltage continuous charge test at 60° C. and 3.5 V for 1,000 hours or more, the electric double layer capacitor characterized in that a positive electrode includes graphite as an electrode active material, a current collector on the positive electrode side is an aluminum material, the aforementioned aluminum material is coated with an amorphous carbon film, and the aforementioned amorphous carbon film has a thickness in a range from 60 nm or more to 300 nm or less.

(2) The electric double layer capacitor according to (1), wherein a current collector on a negative electrode side is any one of materials selected from the group consisting of an aluminum material, etched aluminum, and an aluminum material coated with an amorphous carbon film.

(3) The electric double layer capacitor according to either (1) or (2), wherein the aforementioned graphite includes a rhombohedral crystal.

(4) The electric double layer capacitor according to any one of (1) to (3), wherein a negative electrode includes a carbonaceous material selected from the group consisting of activated carbon, graphite, hard carbon and soft carbon as an electrode active material.

Advantageous Effects of Invention

According to the present invention, it is possible to provide an electric double layer capacitor having a withstand voltage of 3 V or more.

BEST MODE FOR CARRYING OUT THE INVENTION

Figure 1:
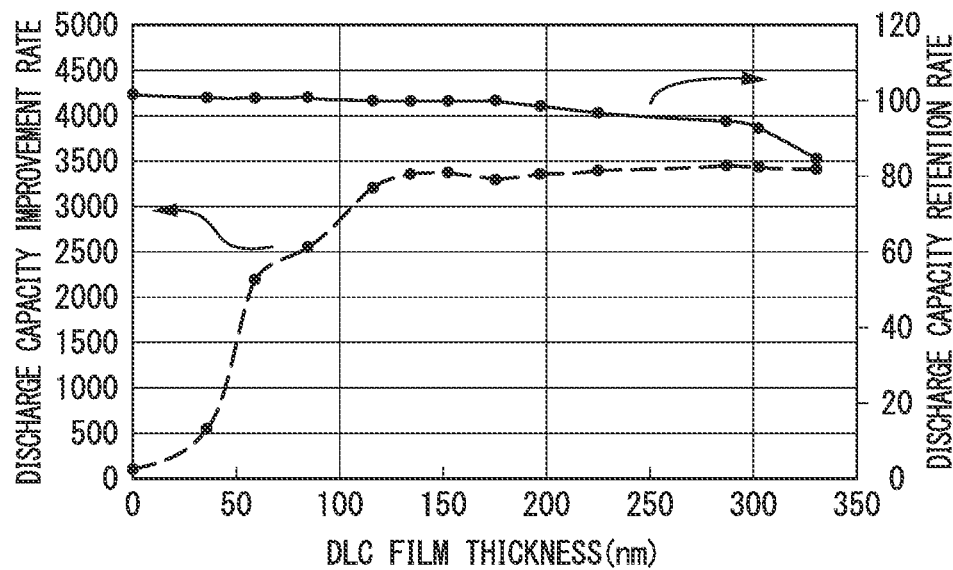
FIG. 1 shows a relationship between the DLC film thickness, and the discharge capacity improvement rate and the discharge capacity retention rate before and after the constant current and constant voltage continuous charge test.

Hereinafter, a configuration of an electric double layer capacitor to which the present invention is applied will be described with reference to the drawings.

It should be noted that configurations other than those described in this specification may be provided within the scope in which the effects of the present invention are exhibited.

An electric double layer capacitor according to an embodiment of the present invention is an electric double layer capacitor capable of maintaining a discharge capacity retention rate of 80% or more in a constant current and constant voltage continuous charge test at 60° C. and 3.5 V for 1,000 hours or more, the electric double layer capacitor including a positive electrode, a negative electrode, an electrolytic solution and a separator which is characterized in that the positive electrode includes graphite as an electrode active material, a current collector on the positive electrode side is an aluminum material, the aluminum material is coated with an amorphous carbon film, and the amorphous carbon film has a thickness in the range from 60 nm or more to 300 nm or less.

The positive electrode is formed by forming a positive-electrode active material layer on a current collector (current collector on the positive electrode side).

The positive-electrode active material layer can be formed by applying a paste-like positive electrode material containing a positive electrode active material, a binder, and a required amount of a conductive material onto a positive-electrode current collector, followed by drying.

As the binder, for example, polyvinylidene fluoride (PVDF), polytetrafluoroethylene (PTFE), fluororubber, ethylene propylene diene rubber, styrene butadiene, acrylic binders, olefinic binders and carboxymethyl cellulose (CMC)-based binders can be used alone, or two or more types thereof can be used as a mixed binder.

The conductive material is also not particularly limited as long as it improves the conductivity of the positive-electrode active material layer, and known conductive materials can be used. For example, carbon black, carbon fibers (including carbon nanotubes (CNT), VGCF (registered trademark) and the like, and not limited to carbon nanotubes), and the like can be used.

The positive-electrode active material used in the electric double layer capacitor of the present invention contains graphite.

As the graphite, any of artificial graphite and natural graphite can be used. Further, scale-like graphite and soil-like graphite are known as natural graphite. Natural graphite is obtained by pulverizing the mined raw ore and repeating a beneficiation process called flotation. In addition, artificial graphite is manufactured, for example, through a graphitization step of calcining a carbon material at a high temperature. More specifically, for example, it can be obtained by adding a binder such as pitch to the coke serving as a raw material, followed by molding, heating the resultant to near 1,300° C. to perform primary firing, and then impregnating the primary fired product into a pitch resin and further performing secondary firing at a high temperature close to 3,000° C.

In addition, the crystal structure of graphite is roughly divided into a hexagonal crystal having a layer structure composed of ABAB and a rhombohedral crystal having a layer structure composed of ABCABC. These crystals may be formed of these structures alone or in a mixed state depending on the conditions, but those of either crystal structure or in a mixed state can also be used. For example, graphite of KS-6 (trade name) manufactured by TIMCAL Ltd. used in Examples described later has a rhombohedral crystal ratio of 26%, and mesocarbon microbeads (MCMB) that are artificial graphite manufactured by Osaka Gas Chemicals Co., Ltd. have a rhombohedral crystal ratio of 0%.

The graphite used as a positive-electrode active material in the present invention is different from the activated carbon used in conventional electric double layer capacitors in the development mechanism of capacitance. In the case of activated carbon, by making use of its large specific surface area, electrolyte ions adsorb and desorb on the surface. On the other hand, in the case of graphite, anions serving as electrolyte ions are inserted and removed (intercalated and deintercalated) between layers of graphite to develop the capacitance. Strictly speaking, a capacitor using graphite corresponds to another electric storage device, because the development mechanism differs between the two cases and it is based on a principle different from that of the electric double layer capacitor in which electrolyte ions are adsorbed onto the surface of the material to form an electric double layer. However, in the present specification, since the capacitance is developed even when graphite is used, it will be called an electric double layer capacitor in a broad sense even when graphite is used.

The current collector on the positive electrode side is an aluminum material covered with an amorphous carbon film.

As the aluminum material serving as the base material, it is possible to use an aluminum material generally used for current collector applications.

As the shape of the aluminum material, forms such as foils, sheets, films and meshes can be adopted. As the current collector, an aluminum foil can be suitably used.

Further, in addition to plain aluminum materials, etched aluminum which will be described later may be used.

When the aluminum material is a foil, a sheet or a film, the thickness is not limited. However, an appropriate thickness may be selected when the batteries themselves are of the same size. It is because the strength decreases while there is a merit in that the thinner, the more the active material to be placed in a cell case can be enclosed. The thickness is preferably from 10 μm to 40 μm, and more preferably from 15 μm to 30 μm. If the thickness is less than 10 μm, the aluminum material may be broken or cracked during the process of roughening the surface of the aluminum material or during another manufacturing process.

Etched aluminum may be used as the aluminum material coated with the amorphous carbon film.

The etched aluminum is subjected to a surface roughening treatment by etching. Etching is generally carried out by a method of dipping (chemical etching) in an acid solution such as hydrochloric acid or performing electrolysis (electrochemical etching) using aluminum as an anode in an acid solution such as hydrochloric acid. The method can be selected from the viewpoint of capacitor performance because the etching shape varies depending on the current waveform, solution composition, temperature and the like during electrolysis in the electrochemical etching process.

Either of those having a passive layer on its surface and those not having a passive layer on its surface can be used as the aluminum material. A passive film which is a natural oxide film is formed on the surface of the aluminum material. A diamond-like carbon (DLC) layer may be provided on the natural oxide film or may be provided after removal of the natural oxide film by, for example, argon sputtering.

The natural oxide film on the aluminum material is a passive film and is unlikely to be corroded by the electrolytic solution which is an advantage in itself. On the other hand, since it leads to an increase in the resistance of the current collector, from the viewpoint of reducing the resistance of the current collector, it is better not to have a natural oxide film.

In the present specification, the amorphous carbon film is an amorphous carbon film or a hydrogenated carbon film, and includes a diamond-like carbon (DLC) film, a hard carbon film, an a-C film, an a-C:H film or the like. As a method for forming the amorphous carbon film, known methods such as a plasma CVD method using a hydrocarbon-based gas, a sputtering vapor deposition method, an ion plating method and a vacuum arc vapor deposition method can be used.

Note that it is desirable to have conductivity to an extent so as to function as a current collector.

Among the exemplified materials of the amorphous carbon film, diamond-like carbon (DLC) is a material having an amorphous structure in which both diamond bonds ($SP^3$) and graphite bonds ($SP^2$) are mixed and has high chemical resistance. However, since it has low conductivity for use as a film of a current collector, boron or nitrogen is preferably doped in order to increase the conductivity.

The thickness of the amorphous carbon film is not less than 60 nm and not more than 300 nm.

If the film thickness of the amorphous carbon film is less than 60 nm, it is too thin and the coating effect of the amorphous carbon film becomes small, so that the corrosion of the current collector in the constant current and constant voltage continuous charge test cannot be sufficiently suppressed. If it exceeds 300 nm and is too thick, since the amorphous carbon coating film layer becomes a resistor to increase the resistance between the coating film layer and the active material layer, an appropriate thickness is suitably selected.

The thickness of the amorphous carbon film is preferably not less than 80 nm and not more than 300 nm, and more preferably not less than 120 nm and not more than 300 nm.

In the case where the amorphous carbon film is formed by the plasma CVD method using a hydrocarbon-based gas, the thickness of the amorphous carbon film can be controlled by the energy injected into the aluminum material, more specifically, by the applied voltage, the application time and the temperature.

Since the current collector of the present invention has the amorphous carbon film on the surface of the aluminum material, it is possible to prevent the aluminum material from coming into contact with the electrolytic solution and to prevent corrosion of the current collector by the electrolytic solution.

The negative electrode is formed by forming a negative-electrode active material layer on a current collector (current collector on the negative electrode side).

The negative-electrode active material layer can be formed by applying a paste-like negative electrode material mainly containing a negative-electrode active material, a binder, and a required amount of conductive materials onto the current collector on the negative electrode side, followed by drying.

As the negative-electrode active material, a material capable of adsorbing/desorbing or inserting/removing (intercalating/deintercalating) cations serving as electrolyte ions can be used, and, for example, a carbonaceous material selected from the group consisting of activated carbon, graphite, hard carbon and soft carbon can be used. It is also a characteristic of the present invention that lithium ions are not used for cations serving as electrolyte ions.

As the current collector on the negative electrode side, a known current collector can be used, although it is possible to use any one of materials selected from the group consisting of an aluminum material, etched aluminum, and an aluminum material coated with an amorphous carbon film. When an aluminum material coated with an amorphous carbon film is used, it is preferable because high temperature durability can be improved when the electric double layer capacitor is operated at a high voltage.

As the binder, for example, polyvinylidene fluoride (PVDF), polytetrafluoroethylene (PTFE), fluororubber, ethylene propylene diene rubber, styrene butadiene, acrylic binders, olefinic binders and carboxymethyl cellulose (CMC)-based binders can be used alone, or two or more types thereof can be used as a mixed binder.

The conductive material is also not particularly limited as long as it improves the conductivity of the negative-electrode active material layer, and known conductive materials can be used.

For example, carbon black, carbon fibers (including carbon nanotubes (CNT), VGCF (registered trademark) and the like, and not limited to carbon nanotubes), and the like can be used.

As the electrolytic solution, an organic electrolyte solution using an organic solvent can be used. The electrolyte contains electrolyte ions that can be adsorbed to and desorbed from the electrode. The type of the electrolyte ion is preferably such that the ionic diameter is as small as possible. More specifically, an ammonium salt, a phosphonium salt, an ionic liquid or the like can be used. Examples of the ammonium salt include tetraethylammonium (TEA) salts, triethylammonium (TEMA) salts and the like. Further, examples of the phosphonium salt include a spiro compound having two five-membered rings, and the like. Examples of the spiro compound include spirobipyrrolidinium (SBP) and the like. In the case of an ionic liquid, although the type thereof is not particularly limited, it is desirable to use a material having as low viscosity as possible and high conductivity (electrical conductivity) from the ease of movement of the electrolyte ions. Specific examples of the cation constituting the ionic liquid include an imidazolium ion, a pyridinium ion and the like. Examples of the imidazolium ion include a 1-ethyl-3-methylimidazolium (EMIm) ion, a 1-methyl-1-propylpyrrolidinium (MPPy) ion, a 1-methyl-1-propylpiperidinium (MPPi) ion, and the like.

Examples of the pyridinium ion include a 1-ethylpyridinium ion, a 1-butylpyridinium ion, a 1-butylpyridinium ion and the like.

Examples of the anion include a $BF_4$ ion, a $PF_6$ ion, a $[(CF_3SO_2)_2N]$ ion, an FSI (bis(fluorosulfonyl)imide) ion, a TFSI (bis(trifluoromethylsulfonyl)imide) ion and the like.

As the solvent, it is possible to use a single solvent or a mixed solvent of acetonitrile, propylene carbonate, dimethyl carbonate, diethyl carbonate, γ-butyrolactone, sulfolane, N,N-dimethylformamide, dimethyl sulfoxide and the like.

As a separator, a cellulose-based paper-like separator, a glass fiber separator or the like is suitable for the reasons such as prevention of short circuit between the positive electrode and the negative electrode and securing of the liquid retention properties of electrolytic solution.

It should be noted that the current collector on the positive electrode side which is composed of an aluminum material covered with the amorphous carbon film used in the electric double layer capacitor of the present invention is also effective in a normal electric double layer capacitor using activated carbon as a positive-electrode active material, making it possible to increase the voltage than before. However, since the activated carbon has a specific surface area as high as two to three orders of magnitude that of the graphite positive electrode of the present invention, the electrode reaction area is wide and the decomposition of the electrolytic solution, the decomposition of the activated carbon itself, or the decomposition of the functional group or the like on the surface of the activated carbon generates gas, thereby causing adverse effects such as an increase in the internal pressure of the cell. Thus, it is not possible to obtain effects such as those of the present invention only by the combination of the activated carbon as the positive-electrode active material and the current collector on the positive electrode side which is composed of the aluminum material covered with the amorphous carbon film.

EXAMPLES

The present invention will be described in more detail below using a series of examples and comparative examples, although the present invention is in no way limited by the following examples.

Example 1

A paste obtained by weighing graphite manufactured by TIMCAL Ltd. (trade name: KS-6) as a positive electrode active material, acetylene black and polyvinylidene fluoride so as to achieve a ratio of 80:10:10 wt. %, and then dissolving and mixing them with N-methylpyrrolidone was applied onto an aluminum foil (20 µm) coated with diamond-like carbon (DLC) by using a doctor blade to prepare a positive electrode. The aluminum foil coated with DLC (hereinafter sometimes referred to as "DLC coated aluminum foil") is a current collector on the positive electrode side and corresponds to an aluminum material covered with an amorphous carbon film. As a method for producing the DLC coated aluminum foil, an aluminum foil having a purity of 99.99% was subjected to argon sputtering to remove a natural oxide film on the surface of the aluminum foil, followed by generation of a discharge plasma in a mixed gas of methane, acetylene and nitrogen in the vicinity of the aluminum surface, and a negative bias voltage was applied to the aluminum material to thereby form a DLC film. Here, the thickness of the DLC film on the aluminum foil coated (covered) with DLC was measured using a stylus-type profilometer Dektak XT manufactured by Bruker Corporation, which was 135 nm.

Next, a paste obtained by weighing activated carbon manufactured by Kansai Coke and Chemicals Co., Ltd. (trade name: MSP-20), acetylene black and polyvinylidene fluoride so as to achieve a ratio of 80:10:10 wt. %, and then dissolving and mixing them with N-methylpyrrolidone was applied onto an etched aluminum foil (20 µm) manufactured by Japan Capacitor Industrial Co., Ltd. by using a doctor blade to prepare a negative electrode.

Subsequently, the positive electrode and the negative electrode described above that were punched to have a diameter of 16 mm were vacuum dried at 150° C. for 24 hours, and then transferred to a glove box. These were laminated via a paper separator (trade name: TF 40-30, manufactured by Nippon Kodoshi Corporation), and 0.1 mL of 1 M tetraethylammonium tetrafluoroborate (TEA-BF4) was added as an organic electrolyte solution to fabricate a 2032 type coin cell in an argon glove box.

Example 2

The same evaluation was carried out on a coin cell prepared in the same manner as in Example 1 except that the same DLC coated aluminum foil (20 µm) as that used as the current collector on the positive electrode side in Example 1 was used as the current collector on the negative electrode side in Example 1.

Example 3

The same evaluation was carried out on a coin cell prepared in the same manner as in Example 1 except that artificial graphite manufactured by Osaka Gas Chemicals Co., Ltd. (trade name: MCMB 6-10) was used as the positive-electrode active material in Example 1.

Example 4

The same evaluation was carried out on a coin cell prepared in the same manner as in Example 1 except that a DLC coated aluminum foil (20 µm) having a DLC film thickness of 0 nm to 420 nm which was obtained by changing DLC coating conditions (applied voltage, application time and temperature) was used. It should be noted that the case of using an aluminum foil having a DLC film thickness of 0 nm does not correspond to a working example of the present invention, but corresponds to Comparative Example 1 described later.

The relation between the DLC film thickness, and the discharge capacity improvement rate and discharge capacity retention rate before and after the constant current and constant voltage continuous charge test is shown in FIG. 1. It should be noted that the discharge capacity improvement rate was evaluated by carrying out a continuous charge test (constant current and constant voltage continuous charge test) for 2,000 hours at 3.5 V and a charging current of 0.4 mA/cm$^2$ in a constant temperature chamber at 60° C. using a charge/discharge tester (BTS 2004, manufactured by Nagano & Co., Ltd.); defining the charging time at which the discharge capacity retention rate after the constant current and constant voltage continuous charge test with respect to the discharge capacity before the start of the constant current and constant voltage continuous charge test became 80% or less as the lifetime; and normalizing the time at which the lifetime of Comparative Example 1 (DLC film thickness of 0 nm (no DLC film)) was reached as 100.

Comparative Example 1

The same evaluation was carried out on a coin cell prepared in the same manner as in Example 1 except that a plain aluminum foil having a thickness of 20 µm was used for the current collector on the positive electrode side.

Comparative Example 2

The same evaluation was carried out on a coin cell prepared in the same manner as in Example 1 except that an etched aluminum foil having a thickness of 20 μm and manufactured by Japan Capacitor Industrial Co., Ltd. was used for the current collector on the positive electrode side.

Comparative Example 3

The same evaluation was carried out on a coin cell prepared in the same manner as in Example 2 except that a plain aluminum foil having a thickness of 20 μm was used for the current collector on the negative electrode side.

Comparative Example 4

The same evaluation was carried out on a coin cell prepared in the same manner as in Example 1 except that the negative electrode using activated carbon (trade name: MSP-20) in Example 1 as the negative-electrode active material was also used for the positive electrode (that is, the case where the activated carbon was used both for the positive-electrode active material and the negative-electrode active material).

Comparative Example 5

The same evaluation was carried out on a coin cell prepared in the same manner as in Example 3 except that an etched aluminum foil having a thickness of 20 m and manufactured by Japan Capacitor Industrial Co., Ltd. was used for the current collector on the positive electrode side.
<Evaluation (Energy, Discharge Capacity)>

The obtained cells were charged and discharged in a range of 0 to 3.5 V with a current density of 0.4 mA/cm$^2$ in a constant temperature chamber at 25° C. using a charge/discharge tester (BTS 2004, manufactured by Nagano & Co., Ltd.), and the energy (Wh) was calculated from the obtained discharge capacity and the average discharge voltage. The results are shown in Table 1. In Table 1, the value obtained by normalizing the energy and discharge capacity in Example 1 with those in Comparative Example 4, and the value obtained by normalizing the energy and discharge capacity in Example 3 with those in Comparative Example 4 are shown. At this time, the numerical values in Comparative Example 4 were normalized as 100.

It should be noted that with respect to the upper limit of the applied voltage, it was possible to apply up to 3.5 V in Examples 1 and 3 in which graphite was used as the positive-electrode active material, but it was measured up to 2.5 V in Comparative Example 4 in which activated carbon was used for the positive electrode.

TABLE 1

| Example/Comparative Example used as reference | Energy | Discharge capacity |
| --- | --- | --- |
| Example 1/Comparative Example 4 | 420 | 300 |
| Example 3/Comparative Example 4 | 310 | 220 |

The energy (the product of the discharge capacity and the average discharge voltage) of Example 1 and Example 3 using graphite as the positive-electrode active material was 4.2 times and 3.1 times, respectively, as high as that of Comparative Example 4 in which conventional activated carbon was used as the positive-electrode active material, and thus it was possible to increase the energy. This is thought to be because graphite can insert and remove electrolyte ions between the layers thereof, and can increase the discharge capacity, as compared with activated carbon that adsorbs and desorbs electrolyte ions on the pore surface. In fact, it was possible to make the discharge capacity, 3 times for Example 1 and 2.2 times for Example 3, as high as that of Comparative Example 4. In addition, when graphite was used as the positive-electrode active material, the fact that the voltage could be increased as compared with the case where the activated carbon was used as the positive-electrode active material was also a factor that the energy could be improved.

The only difference between Example 1 and Example 3 is in the type of graphite of the positive-electrode active material, but there are differences in terms of energy and discharge capacity as shown in Table 1.

The graphite manufactured by TIMCAL Ltd. (trade name: KS-6) contains 26% of rhombohedral crystals (accordingly, contains 76% of hexagonal crystals), while the mesocarbon microbeads (MCMB) manufactured by Osaka Gas Chemicals Co., Ltd. does not contain rhombohedral crystals.

The rhombohedral crystal is a layer structure composed of ABCABC, whereas the hexagonal crystal is a layer structure composed of ABAB, and it is considered that the difference in crystal structure affects the above performance. In other words, it is considered that since the shape change of rhombohedral crystals accompanying the insertion of ions is greater than that of hexagonal crystals, the insertion of ions is less likely to occur, thereby affecting the results.

Based on the results shown in Table 1, in view of energy and discharge capacity, as the graphite of the positive-electrode active material, it is preferable to contain rhombohedral crystals.
<Evaluation (Discharge Capacity Improvement Rate)>

With respect to the obtained cell, a continuous charge test (constant current and constant voltage continuous charge test) was carried out for 2,000 hours at 3.5 V and a charging current of 0.4 mA/cm$^2$ in a constant temperature chamber at 60° C. using a charge/discharge tester (BTS 2004, manufactured by Nagano & Co., Ltd.). The charging time at which the discharge capacity retention rate after the constant current and constant voltage continuous charge test with respect to the discharge capacity before the start of the constant current and constant voltage continuous charge test became 80% or less was defined as the lifetime, and the time at which the lifetime in a comparative example was reached was normalized as 100 and shown in Table 2 as the discharge capacity improvement rate. In other words, the cases where the plain aluminum foil of Comparative Example 1 and the etched aluminum foil of Comparative Examples 2 and 5 were used as the current collector on the positive electrode side were normalized as 100.

TABLE 2

| Example/Comparative Example used as reference | Discharge capacity improvement rate |
| --- | --- |
| Example 1/Comparative Example 1 | 3,280 |
| Example 1/Comparative Example 2 | 3,080 |
| Example 3/Comparative Example 5 | 2,600 |

In Example 1 in which the graphite serving as the positive-electrode active material contained rhombohedral crystals and the current collector on the positive electrode side was DLC coated aluminum foil (DLC film was 135 nm), the discharge capacity retention rate after 2,000 hours of constant current and constant voltage continuous charge test was 82%. Further, in Example 3 in which the graphite serving as the positive-electrode active material did not contain rhombohedral crystals and the current collector on the positive electrode side was DLC coated aluminum foil (DLC film was 135 nm), the discharge capacity retention rate after 2,000 hours of constant current and constant voltage continuous charge test was 80%.

With the electric double layer capacitor of the present invention, it became possible to satisfy the standard of a discharge capacity retention rate of 80% or more after a constant current and constant voltage continuous charge test for 2,000 hours at 60° C. at a voltage of 3 V or more.

On the other hand, in Comparative Example 1 in which the graphite serving as the positive-electrode active material contained rhombohedral crystals and the current collector on the positive electrode side was plain aluminum foil, the discharge capacity retention rate became 80% or less in 61 hours.

Further, in Comparative Example 2 in which the graphite serving as the positive-electrode active material contained rhombohedral crystals and the etched aluminum foil was used for the current collector on the positive electrode side, the discharge capacity retention rate became 80% or less in 65 hours.

In addition, in Comparative Example 5 in which the graphite serving as the positive-electrode active material did not contain rhombohedral crystals and the etched aluminum foil was used for the current collector on the positive electrode side, the discharge capacity retention rate became 80% or less in 77 hours.

As shown in Table 2, in Examples 1 and 3 in which the DLC coated aluminum foil of the present invention was used for the current collector on the positive electrode side, it was possible to improve the durability considerably, with respect to Comparative Examples in which the current collector on the positive electrode side was a plain aluminum foil or etched aluminum foil.

This result indicates that corrosion of the current collector is the main factor hampering the durability.

<Effects of Film Thickness of Amorphous Carbon Film>

As a result of conducting the above-mentioned constant current and constant voltage continuous charge test by changing the film thickness of the DLC film as Example 4, the discharge capacity retention rate became 80% or less in 305 hours when the film thickness was 40 nm, the discharge capacity retention rate became 80% or less in 1,340 hours when the film thickness was 60 nm, and the discharge capacity retention rate became 80% or less in 1,525 hours when the film thickness was 80 nm. On the other hand, when the film thickness was 120 nm or more (measured up to the maximum of 330 nm), the discharge capacity retention rate remained at 80% even after 2,000 hours (after the constant current and constant voltage continuous charge test).

As described above, when the film thickness of the DLC film is 60 nm or more, it was found that the discharge capacity retention rate of 80% can be maintained for 1,000 hours or more in the constant current and constant voltage continuous charge test at 60° C. and 3.5 V. In addition, it became clear that if the film thickness of the DLC film is 80 nm or more, the discharge capacity retention rate of 80% can be maintained for 1,500 hours or more in the constant current and constant voltage continuous charge test at 60° C. and 3.5 V. Further, if the film thickness of the DLC film is 120 nm or more, the discharge capacity retention rate of 80% can be maintained after the above-mentioned constant current and constant voltage continuous charge test at an applied voltage of 3.5 V.

As described above, in the constant current and constant voltage continuous charge test, the lifetime in Comparative Example 1 was 61 hours.

FIG. 1 is obtained by normalizing the lifetime of 61 hours in Comparative Example 1 to 100 for evaluation.

From FIG. 1, it is clear that when the film thickness of the DLC film exceeds 60 nm, the discharge capacity improvement rate is considerably improved as compared with the case where the DLC film is absent (DLC film was 0 nm).

On the other hand, when the film thickness of the DLC film further increases and exceeds 120 nm, although a high discharge capacity improvement rate can be maintained, when it exceeds 300 nm, the discharge capacity retention rate is reduced since the electrical resistance between the DLC film and the electrode active material layer becomes large.

Therefore, in the electric double layer capacitor of the present invention, the film thickness of the DLC film is in the range from 60 nm or more to 300 nm or less.

Figure 2:
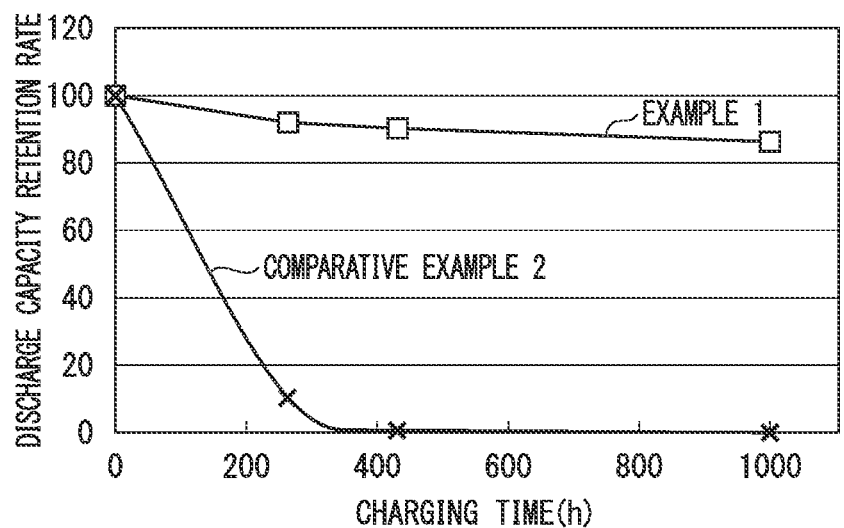
FIG. 2 shows the results of a constant current and constant voltage continuous charge test conducted on the coin cells of Example 1 and Comparative Example 2.
Figure 3:
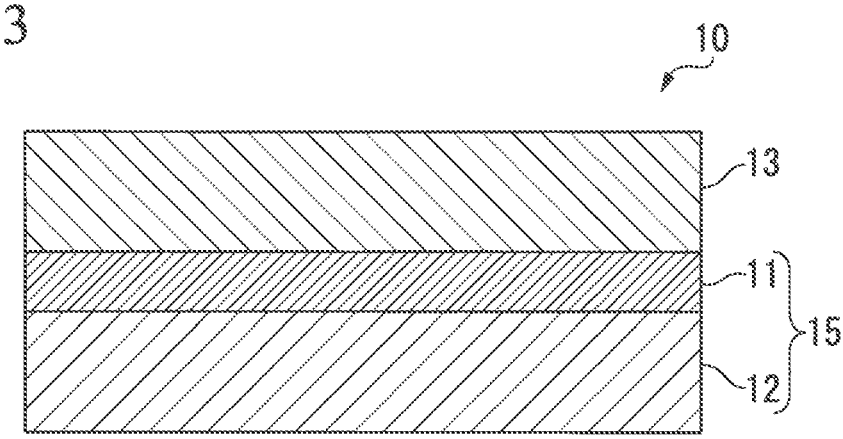
FIG. 3 shows a schematic sectional view of a positive electrode 10 which includes a positive-electrode active material layer 13 provided on a current collector 15 made of the aluminum material 12 covered with an amorphous carbon film 11, according to an embodiment of the present invention.
Figure 4:
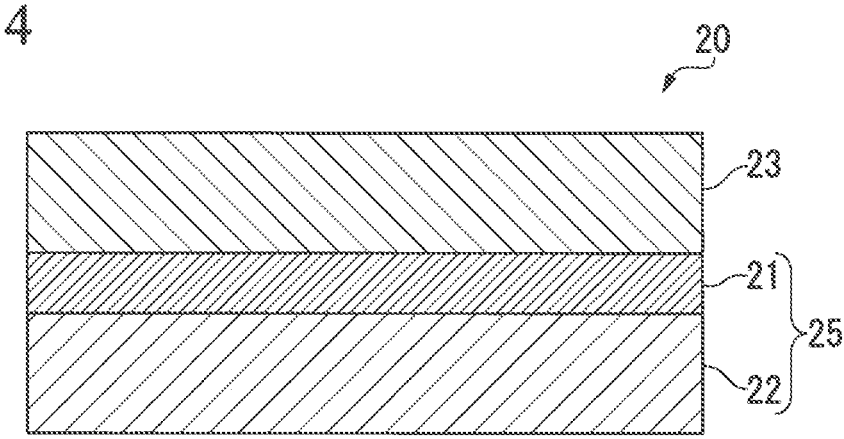
FIG. 4 shows a schematic sectional view of a negative electrode 20 which includes a negative-electrode active material layer 23 provided on a current collector 25 made of the aluminum material 22 covered with an amorphous carbon film 21, according to an embodiment of the present invention.

FIG. 2 shows the results of a continuous charge test (constant current and constant voltage continuous charge test) conducted on the coin cell of Example 1 (the case where the positive-electrode current collector is a DLC coated aluminum foil and the negative-electrode current collector is an etched aluminum foil) and on the coin cell of Comparative Example 2 (the case where both the positive-electrode current collector and the negative-electrode current collector are etched aluminum foils) which was carried out at 3.5 V and a charging current of 0.4 mA/cm$^2$ in a constant temperature chamber at 60° C. using a charge/discharge tester (BTS 2004, manufactured by Nagano & Co., Ltd.).

The graph is obtained by setting the discharge capacity before the start of the test to 100, and shows the discharge capacity after the start of the test, that is, after each charging time has elapsed, as a ratio with respect to the discharge capacity of 100.

For the coin cell of Comparative Example 2, the discharge capacity was already 10% after 264 hours and the discharge capacity was 0% after 432 hours, whereas the discharge capacity of the coin cell of Example 1 was 92% after 264 hours and 90% after 432 hours, respectively, and it was 86% even after 1,000 hours had passed.

The invention claimed is:

1. An electric double layer capacitor capable of maintaining a discharge capacity retention rate of 80% or more in a constant current and constant voltage continuous charge test at 60° C. and 3.5 V for 1,000 hours or more, wherein
    a positive electrode includes a positive-electrode active material layer and a current collector in a positive electrode side, and the positive-electrode active material layer arranged on the current collector,
    the positive-electrode active material layer includes graphite as a positive electrode active material,
    the current collector on the positive electrode side is an aluminum material,
    the aluminum material is coated exclusively with a film composed of an amorphous carbon and one or more optional element selected from a group consisting of boron and nitrogen, and
    the amorphous carbon film has a thickness in a range from 60 nm or more to 300 nm or less.

2. The electric double layer capacitor according to claim 1,
    wherein a current collector on a negative electrode side is any one of materials selected from the group consisting of an aluminum material, etched aluminum, and an aluminum material coated with an amorphous carbon film.

3. The electric double layer capacitor according to claim 1, wherein the graphite comprises a rhombohedral crystal.

4. The electric double layer capacitor according to claim 1,
wherein a negative electrode comprises a carbonaceous material selected from the group consisting of activated carbon, graphite, hard carbon and soft carbon as a negative-electrode active material.

5. The electric double layer capacitor according to claim 2, wherein the graphite comprises a rhombohedral crystal.

6. The electric double layer capacitor according to claim 2,
wherein a negative electrode comprises a carbonaceous material selected from the group consisting of activated carbon, graphite, hard carbon and soft carbon as a negative-electrode active material.

7. The electric double layer capacitor according to claim 3,
wherein a negative electrode comprises a carbonaceous material selected from the group consisting of activated carbon, graphite, hard carbon and soft carbon as a negative-electrode active material.

8. The electric double layer capacitor according to claim 5,
wherein a negative electrode comprises a carbonaceous material selected from the group consisting of activated carbon, graphite, hard carbon and soft carbon as a negative-electrode active material.

9. The electric double layer capacitor according to claim 1,
wherein the amorphous carbon film is one or more selected from a group consisting of a diamond-like carbon film, a hard carbon film, an a-C film, and an a-C:H film.

10. The electric double layer capacitor according to claim 1,
wherein the amorphous carbon film is one or more selected from a group consisting of a diamond-like carbon film, an a-C film, and an a-C:H film.

11. The electric double layer capacitor according to claim 1,
wherein the amorphous carbon film is a diamond-like carbon film in which boron or nitrogen is preferably doped.

* * * * *